F. E. SCHROM.
Sounding-Machine.

No. 197,800.  Patented Dec. 4, 1877.

WITNESSES:
H. Rydquist.
J. H. Scarborough.

INVENTOR:
F. E. Schrom.
BY Munn & Co.
ATTORNEYS.

UNITED STATES PATENT OFFICE.

FRANK E. SCHROM, OF WHITEWATER, WISCONSIN.

IMPROVEMENT IN SOUNDING-MACHINES.

Specification forming part of Letters Patent No. 197,800, dated December 4, 1877; application filed October 12, 1877.

*To all whom it may concern:*

Be it known that I, FRANK E. SCHROM, of Whitewater, in the county of Walworth and State of Wisconsin, have invented a new and Improved Sounding-Machine, of which the following is a specification:

The object of this invention is to provide a machine or instrument for sounding in which the depth of water is indicated to the eye in a convenient manner.

The invention consists in a combination of an endless graduated indicating-belt with the reel that carries the sounding-line, as hereinafter described; and further consists of a peculiar combination of the said indicating-belt, as hereinafter set forth.

Figure 1:
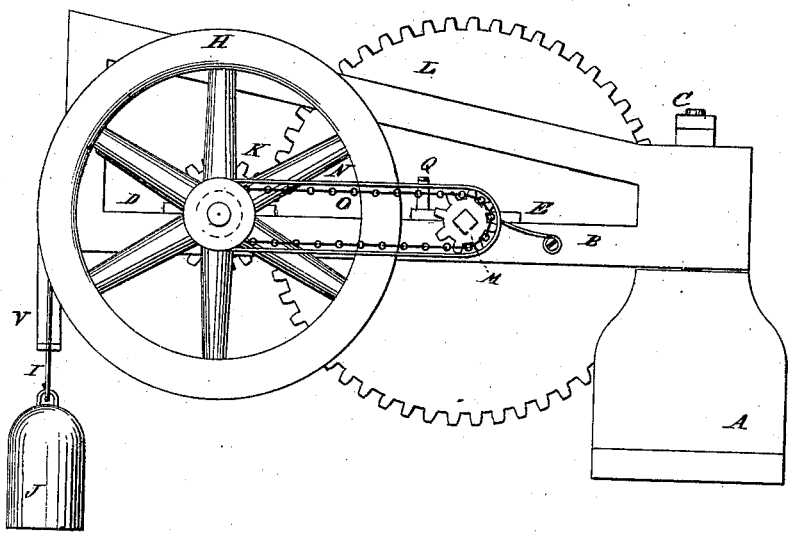
Figure 2:
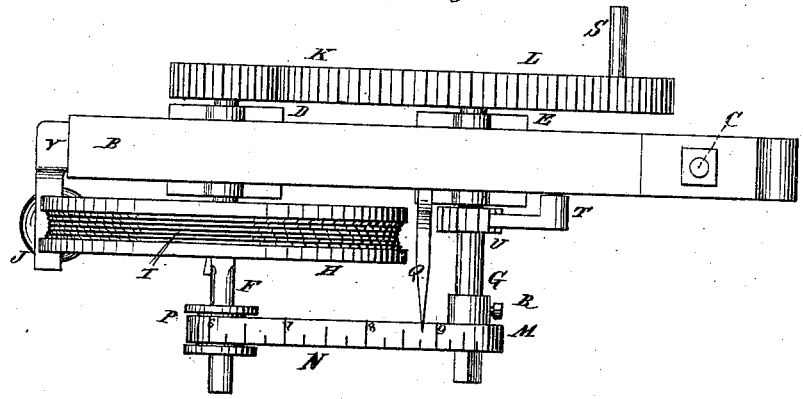

In the drawings, Figure 1 is a side elevation of a machine or instrument having my improvements. Fig. 2 is a plan of same.

Similar letters of reference indicate corresponding parts.

A is a support, to be firmly secured in any suitable manner to the rail of a ship or other object.

B is a swinging arm or frame, pivoted to the support A by a vertical bolt, C, in such a manner that it may swing outboard when soundings are about to be made, and inboard that the machine may be housed when not in use.

On the arm or frame B are two boxes, D and E, in which revolve two parallel shafts or axles, F and G.

Upon the axle F, and on the inboard side of the frame B, is placed the reel H, around the face of which is wound the sounding line or wire I. One end of the said line is secured to the reel H, and to the other end an ordinary lead, J, is attached.

Upon the outboard end of axle F is placed a small spur-wheel, K, that drives a large spur-wheel, L, on the axle G. On the inboard extremity of this axle is secured a small belt-wheel, M, that gives motion to an endless graduated indicating-belt, O, which runs over a small roller or loose pulley, P, on the projecting end of axle F.

The belt-wheel M has suitable teeth or projections, to prevent the slipping of the indicating belt or chain O.

The endless indicating belt or chain O may be constructed in any suitable manner, and is to be provided upon its surface with figures or marks, to indicate to the eye the extent of its travel.

In the present example of my invention, I attach to the exterior surface of the indicating-belt O a covering, N, of leather or other flexible material, on which I place the said figures or markings, as shown in Fig. 2.

A relatively low velocity is, by the devices described, imparted to the belt O, in such a manner that equal lengths of the sounding-line, when winding upon or unwinding from the reel, are represented by much shorter equal distances moved by any point on the belt, and the belt is graduated and the graduations numbered to represent fathoms or quarter-fathoms on the line.

Attached to and projecting from the frame is an index-pointer, Q, the point of which is nearly in contact with the upper face of the belt O.

The instrument should be so adjusted that when the lead J is at the surface of the water the index-pointer will indicate 0 (zero) on the belt. To facilitate this adjustment the driving-roller M should revolve easily on its axle, and can be secured in any desired position by the set-screw R.

By the projection of the axles F and G inboard beyond the face of the reel, and by placing the pulleys M and P on the projecting extremities, the employment of a third axle for the pulley P is avoided, and the belt O located in such a position that it may be readily inspected.

The sounding-line is wound upon the reel by the use of the handle S, attached to the spur-wheel L, and prevented from unwinding by the pawl T, hinged to the frame B, and the ratchet U on the axle G, and is guided by the guide-arm V, attached to and projecting from the frame B.

Having thus described my invention, I claim as new and desire to secure by Letters Patent—

1. A mechanism for indicating the depth of water in sounding, in which an endless indicating-belt is combined with the line-reel, substantially in the manner described.

2. The combination of a covering, N, with the indicating belt or chain O, substantially as described.

FRANK EUGENE SCHROM.

Witnesses:
 ALFRED E. CHAFFEE,
 THEODORE H. PACKARD.